United States Patent [19]
Olinger, Jr. et al.

[11] 3,921,100
[45] Nov. 18, 1975

[54] GAS DYNAMIC LASER HAVING SHUTTER DOORS

[75] Inventors: John B. Olinger, Jr., Lake Park; Roger L. Wahl, Tequesta, both of Fla.

[73] Assignee: United Technologies Corporation, Hartford, Conn.

[22] Filed: Sept. 23, 1974

[21] Appl. No.: 508,791

[52] U.S. Cl............... 331/94.5 D; 330/4.3; 49/213; 49/420; 49/426; 331/94.5 G; 331/94.5 C
[51] Int. Cl.² ..... H01S 3/02; H01S 3/08; H01S 3/22
[58] Field of Search...................... 49/213, 420, 426; 331/94.5; 330/4.3

[56] References Cited
UNITED STATES PATENTS

| | | | |
|---|---|---|---|
| 3,777,279 | 12/1973 | Eckbreth et al. | 331/94.5 G |
| 3,801,927 | 4/1974 | Allen | 331/94.5 G |

OTHER PUBLICATIONS van der Speck, Refrigeration and Airconditioning, June 1973, pp. 29–32.

*Primary Examiner*—Robert J. Webster
*Attorney, Agent, or Firm*—Jack N. McCarthy

[57] ABSTRACT

A gas dynamic laser is shown wherein gases containing constituents necessary to obtain a lasing action are passed through a nozzle array and directed into a lasing cavity and through a diffuser to an exit. An opening is located on each side of said lasing cavity with a shutter box outside of said cavity having a shutter door for opening or closing said opening. A mirror box is located behind each shutter box and contains a mirror. These mirros are aligned with the openings in the lasing cavity with each door positioned between an opening and a mirror. Another outlet opening is positioned downstream of the first opening which provides an outlet opening for a laser beam. A shutter box is located around this opening and also houses a shutter door for opening and closing said opening. The mirror box which extends behind this shutter box includes opening means for permitting the output beam to pass through an aerodynamic window to atmosphere. Actuating means are provided for rapidly opening and closing said shutter doors. Bearing means including recirculating balls are located on the top and bottom of each shutter door to ride in tracks at an angle to the sealing surface on the laser device. Vacuum means are provided to reduce the pressure in the shutter box and mirror box independently of the pressure in the lasing cavity.

1 Claim, 4 Drawing Figures

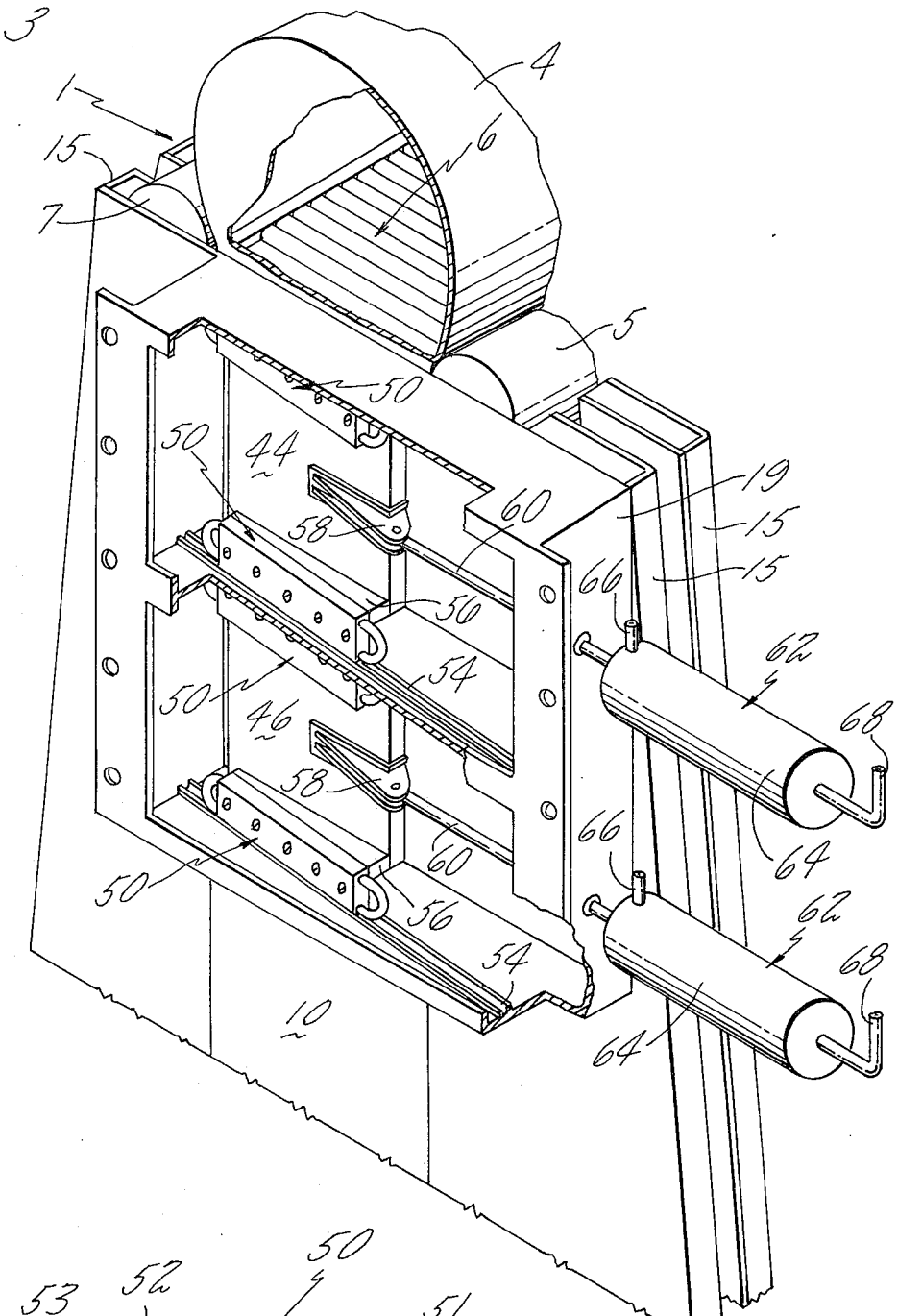
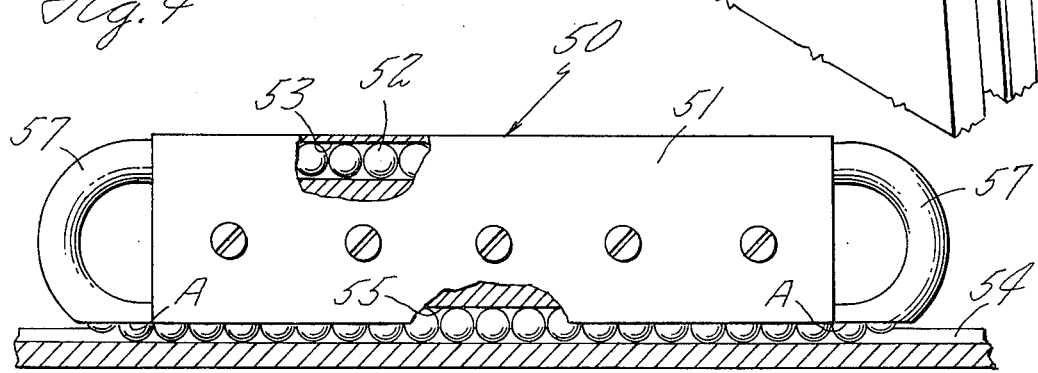

GAS DYNAMIC LASER HAVING SHUTTER DOORS

The invention herein described was made in the course of or under a contract or subcontract thereunder with the Department of the Air Force.

BACKGROUND OF THE INVENTION

This invention relates to gas dynamic lasers and especially to one which uses shutter doors in its operation. While shutter doors have been used before, the arrangement set forth in this application is believed to advance the prior art. A gas dynamic laser having a shutter door is shown in U.S. Pat. No. 3,801,927.

SUMMARY OF THE INVENTION

An object of this invention is to provide a gas dynamic laser having shutter doors for apertures located in the walls of a lasing cavity, said shutter doors being located between said apertures in mirrors.

A further object of the invention is to provide rapidly moving shutter doors which seal the shutter boxes and mirror boxes from the lasing cavity thereby reducing the volume necessary to be evacuated by the diffuser during its start. Vacuum means are provided to evacuate the area within the shutter boxes and mirror boxes. Shutter doors can also be used to initiate beam operation and they have the capability of aborting the laser beam if required.

In accordance with the present invention, a recirculating ball bearing assembly is mounted adjacent to the top and bottom of each shutter door with the balls being guided in tracks, or races, located at the top and bottom of each of the shutter boxes.

In accordance with the present invention, the tracks, or races, are placed at an angle relative to the plane of the shutter door sealing surface so that the shutter door only contacts the sealing surface at the last instant of the closing movement of the shutter door. The face of the shutter door always remains parallel to the sealing surface against which the shutter door closes.

Another object of this invention is to provide an actuating device which will provide a force parallel with the track, or race, on which the ball bearing device rides.

BRIEF DESCRIPTION OF THE DRAWING

FIG. 3 is a perspective view of an end of the laser device having two shutter doors with the mirror box removed.

FIG. 4 is a side view of one of the shutter door bearing units.

DESCRIPTION OF THE PREFERRED EMBODIMENT

Figure 1:
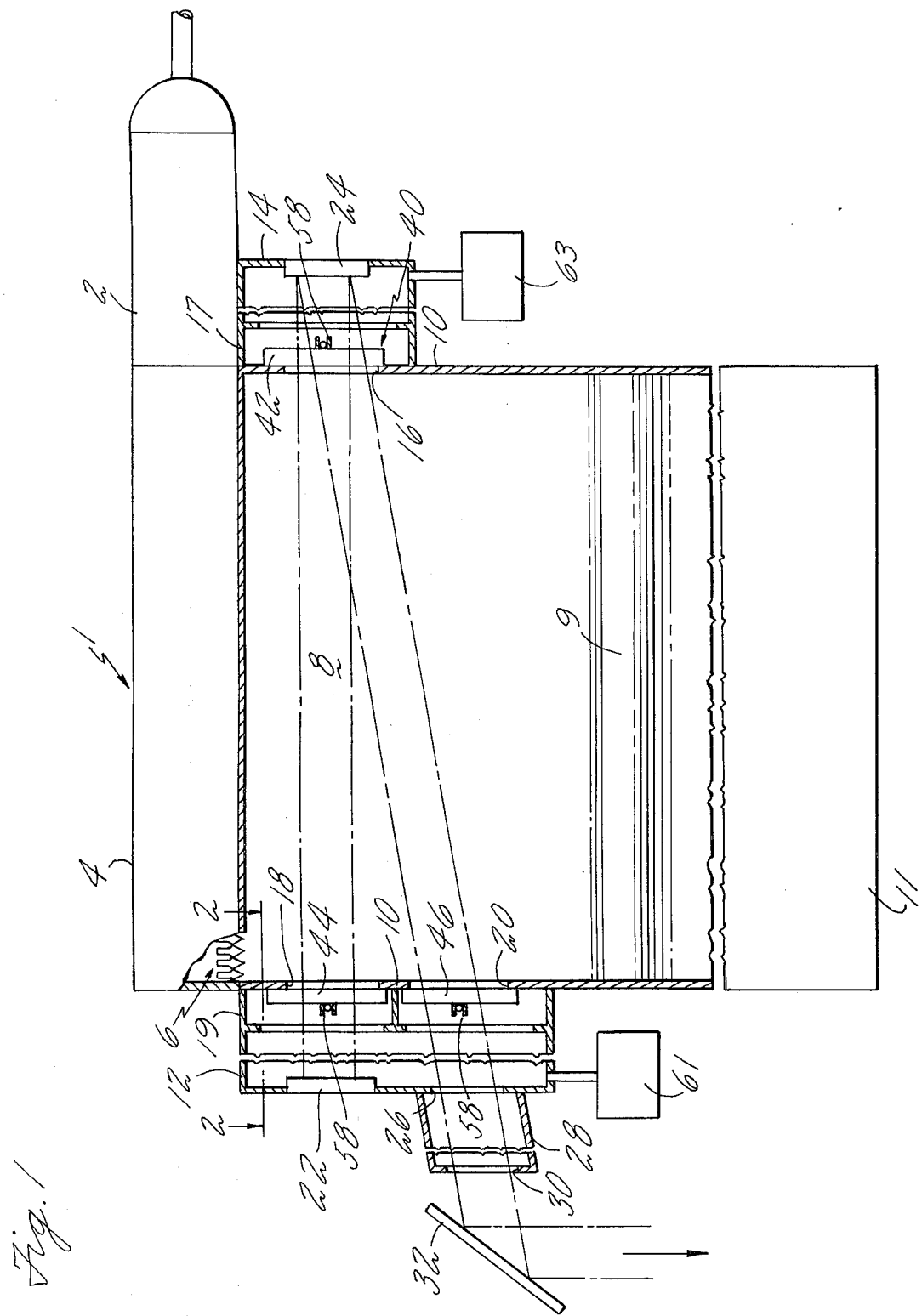
FIG. 1 is a schematic view of a gas dynamic laser device showing the location of the shutter doors.

FIG. 1 shows a gas dynamic laser device 1 having a combustor 2 connected to a manifold 4 for directing a flow of gases thereinto. A combustion chamber for producing gas for a gas dynamic laser is shown in U.S. Pat. No. 3,779,695. The gases flow from the manifold 4 through a nozzle array 6 into a lasing cavity 8 formed within a housing 10. The gases then flow from the lasing cavity 8 through a diffuser 9 and out the exit 11 to the atmosphere. A nozzle array is shown in U.S. Pat. No. 3,602,432. The gases from combustor 2 contain the constituents necessary to obtain a lasing action when they are expanded through the nozzle array 6. Two small manifolds 5 and 7 extend alongside manifold 4 adjacent the ends of the nozzle array 6. A coolant enters manifold 5 and flows through opening extending lengthwise in each of the members of the nozzle array 6 and exists into manifold 7 where it is directed away therefrom. Support members 15 are located on each side of the housing 10 to support the laser device.

Lasing cavity 8 has an opening 16 provided on one side through housing 10 adjacent one end of the manifold 4 and an opening 18 provided on the other side through housing 10 adjacent the other end of the manifold 4. These openings 18 and 16 are aligned to permit a lasing beam to pass therethrough downstream of the nozzle array 6. An opening 20 is provided in the housing 10 downstream of opening 18 so that an output beam can pass from the lasing cavity 8 of the gas dynamic laser device 1 to the atmosphere.

A shutter box 17 is located outside of the laser cavity 8 and is attached to the housing 10 around the opening 16. This shutter box 17 contains a shutter door 42 which can be moved between an "open" and "closed" position to open or close the opening 16 in a manner to be hereinafter described. A mirror box 14 is connected to the back of the shutter box 17 and contains a mirror 24. The back of the shutter box 17 is open so that the interior of the shutter box 17 and the interior of the mirror box 14 are substantially one open area. A double shutter box 19 is located outside of the laser cavity 8 and is attached to the housing 10 around the openings 18 and 20. This double shutter box 19 contains two shutter doors 44 and 46 which can be moved between open and closed positions to open or close openings 18 and 20 respectively, in a manner to be hereinafter described. A mirror box 12 is connected to the back of the double shutter box 19 and contains a mirror 22 which is axially aligned with mirror 24 and openings 18 and 16 so that a lasing beam can pass between the mirrors 22 and 24. The back of the double shutter box 19 is open so that the interior of the shutter box 19 and the interior of the mirror box 12 are substantially one open area. The mirror 24 is constructed so that an output beam therefrom will pass through the opening 20. Laser mirrors are shown in U.S. Pat. No. 3,637,296 and U.S. Pat. No. 3,645,608.

An opening 26 is provided in the outer wall of the mirror box 12 in alignment with openings 20 and 16 to permit an output beam to pass through a duct 28 which extends outwardly from the wall of the mirror box 12 around the opening 26. Duct 28 contains an aerodynamic window (not shown) such as disclosed in U.S. Pat. Nos. 3,604,789, 3,617,928 or 3,654,569. An output beam passes through an outlet 30 in the end of the duct 28 to means for directing or aiming the beam such as an adjustable mirror 32.

Each shutter door 42, 44 and 46 is constructed in a like manner. Each shutter door comprises a flat plate which is larger than the opening which it covers and includes a bearing means 50 attached to the top and bottom of each shutter door to provide for ease of operating of the shutter door. Bearing means 50 comprises an elongated recirculating ball bearing device 51 which provides for recirculating balls 52. The ball bearing device 51 is made up of an elongated block having a channel 53 through one side and a groove 55 along this side. A tube member 57 connects the channel 53 to the groove 55 at each end of the block. The tube member 57 is cut at A to form a continuation of the groove 55 and permit the balls 52 to pass between a position engaging a groove 55 and track 54 to a position in a tube member 57. The groove 55 of each ball bearing device 51 is provided so that a long line of the balls can engage a track. A track 54 is provided at the top and bottom of each of the shutter boxes to receive the long line of balls 52 in a groove 55 on the bearing side of the bearing means 50.

Figure 2:
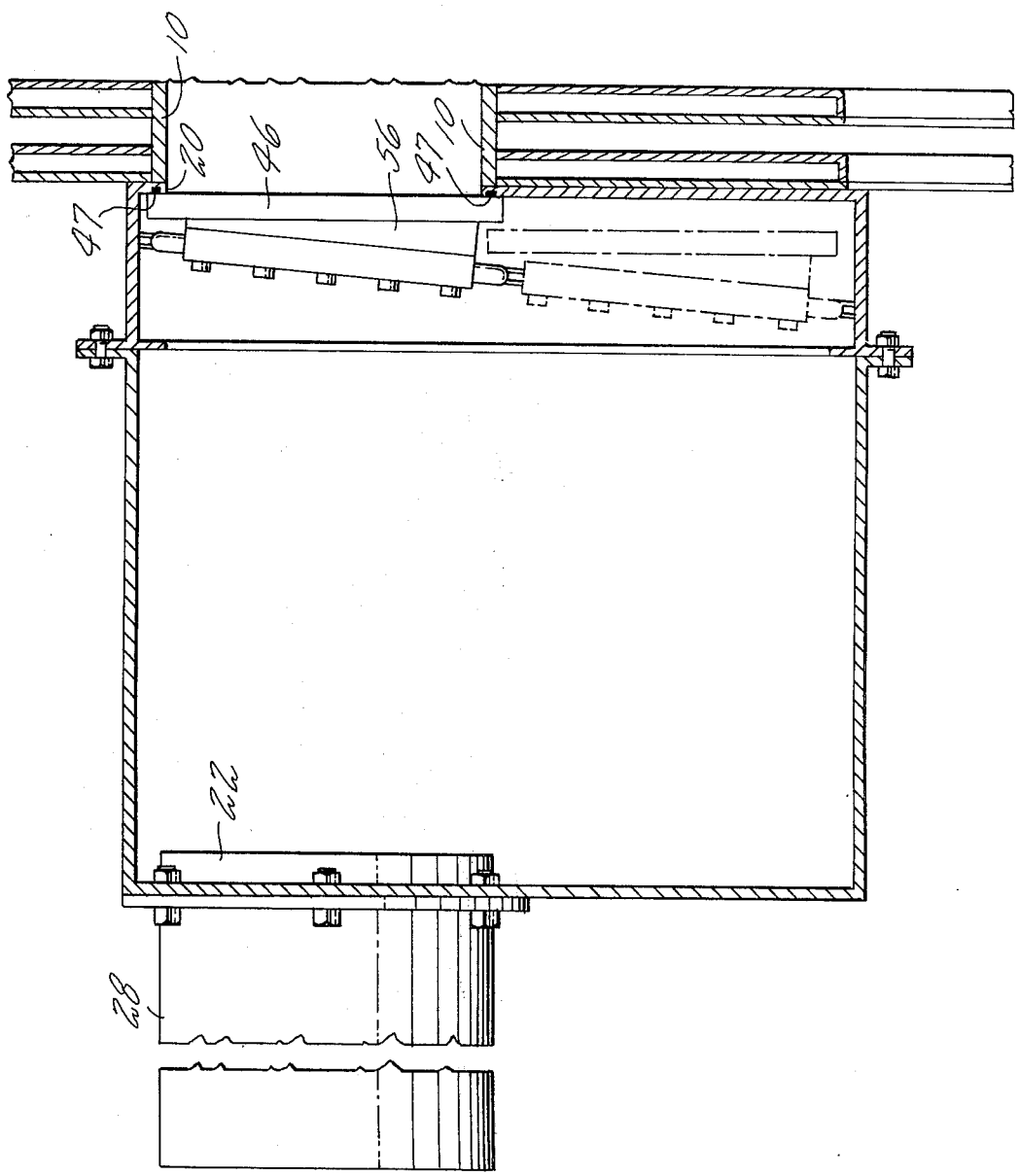
FIG. 2 is a view taken along the line 2—2 of FIG. 1 showing a shutter door, shutter box and mirror box.

The center line of the bearing track 54, or race, is placed at an angle relative to the plane of the shutter door sealing surface permitting the door to close almost completely before it contacts and rubs against the face of the seal 47 located around the opening. To provide for this angular variance a wedge shaped member 56 is provided between the bearing means 50 and the shutter door. See FIG. 2 where the shutter door 46 is shown in a closed position in solid lines and in a full open position by phantom lines. In a construction made approximately 4 to 5 degrees was used for the angular difference between the track 54 and the plane of the shutter door.

Each door has a bracket 58 thereon providing a connection for the end of an actuating rod 60 from an actuating mechanism 62. Each actuating rod 60 passes through the side of its cooperating shutter box where it is sealed and extends to an actuating cylinder-piston unit 64. Conventional means can direct an actuating fluid to either end of the cylinder-piston unit 64 through conduits 66 and 68. In the operation of a laser device the doors can be opened and closed simultaneously or sequentially, as desired. The cylinder-piston unit 64 can be connected to any fixed structure of the gas dynamic laser device.

In operation, the shutter doors 42, 44 and 46 are closed when the combustor 2 is started thereby diverting a flow through the manifold 4 and nozzle array 6. This flow through the diffuser 9 pumps down the lasing cavity 8, however no lasing occurs until the shutter doors are opened exposing the mirror 22 and 24 and the duct 28 containing an aerodynamic window. If desired, the area within the shutter boxes 17 and 19 and mirror boxes 12 and 14 can be pumped down by vacuum means 61 and 63, respectively, to approximately the pressure in the lasing cavity 8.

We claim:

1. In a gas dynamic laser the combination comprising: means for providing a lasing gas, a housing forming a lasing cavity, a nozzle array for introducing a gas containing constituents necessary to obtain a lasing action into said lasing cavity, diffuser means for directing gas flow from said cavity, said housing around said lasing cavity having a first opening on one side thereof and a second opening on the other side, a first box means located on the exterior of said housing around said first opening, a second box means located on the exterior of said housing around said second opening, a mirror positioned in each box means in alignment with said two openings, a third opening located in said housing downstream of said other openings, said third opening being positioned to receive an output beam from said mirror in said second box means, said third opening also being connected to said first box means, a fourth opening in said first box means aligned with said third opening to permit the output beam to pass to the exterior of the first box means, an aerodynamic window connected to said fourth opening, a shutter door being located in said first and second box means adjacent each of said openings to reduce the volume necessary to be evacuated by the diffuser means during the start of flow through the diffuser means and to control the opening and closing of said openings to start and stop the lasing action, one shutter door in said first box means being located between the mirror and first opening, one shutter door being located in said first box means between said third opening and aerodynamic window, one shutter door in said second box means being located between the mirror and second opening, means for sliding each door at an angle to the plane of the opening in said housing so that a shutter door is rapidly moved to and from its closed position, means for actuating said shutter doors to move them between an open and closed position, means for reducing the pressure in both the first and second box means when the doors are closed to balance the pressure on both sides of the doors in preparation for starting the lasing action.

* * * * *